Figure 5:
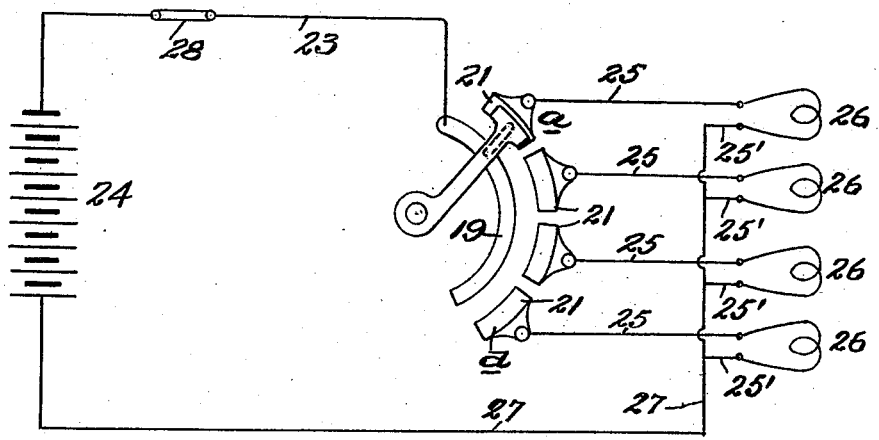

C. C. KING.
STORAGE BATTERY VENTILATING SYSTEM.
APPLICATION FILED SEPT. 5, 1919. RENEWED JAN. 16, 1922.
1,416,214.
Patented May 16, 1922.
3 SHEETS—SHEET 1.
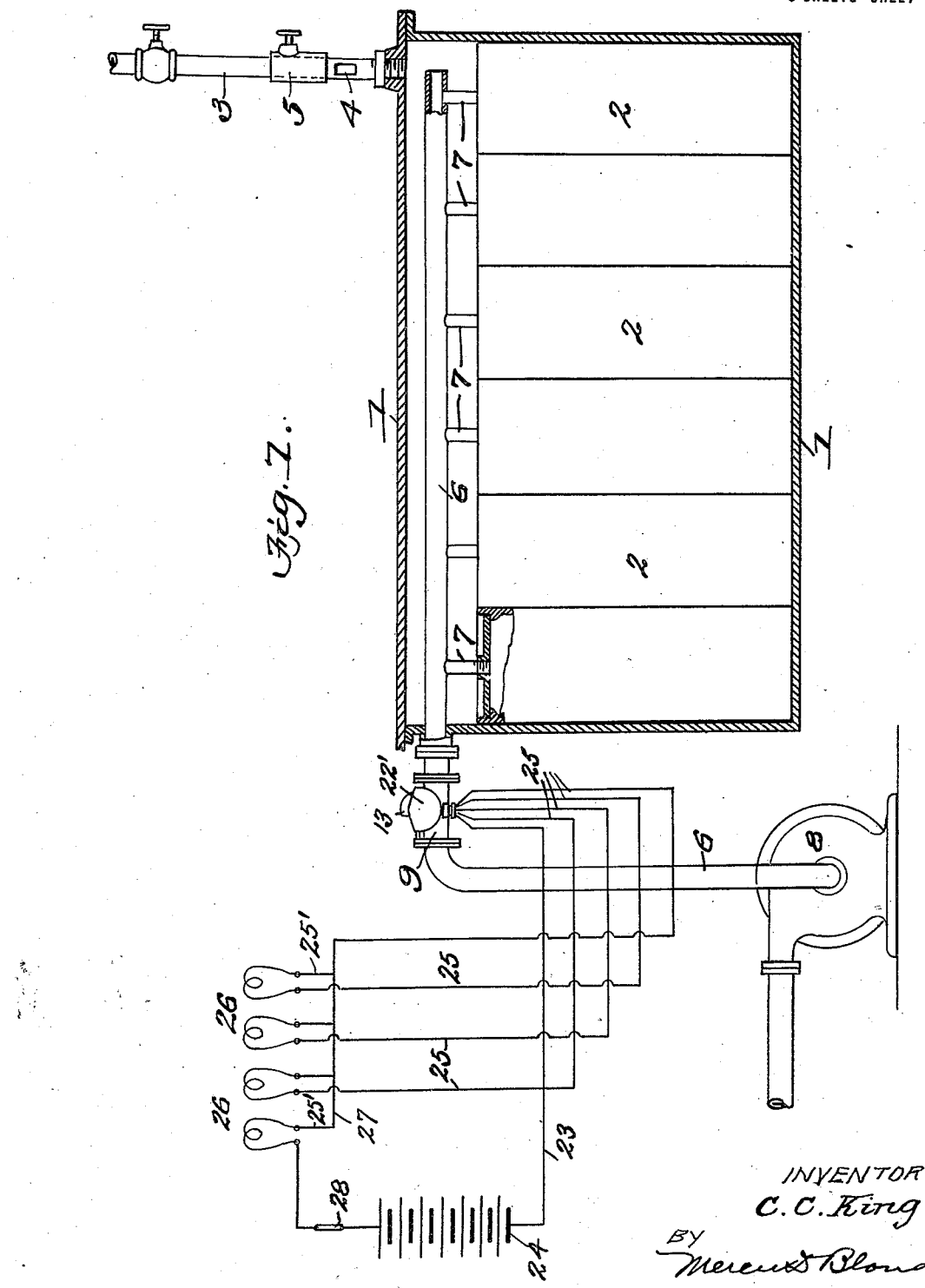
INVENTOR
C. C. King
BY
Merewd Blondel
ATTORNEY

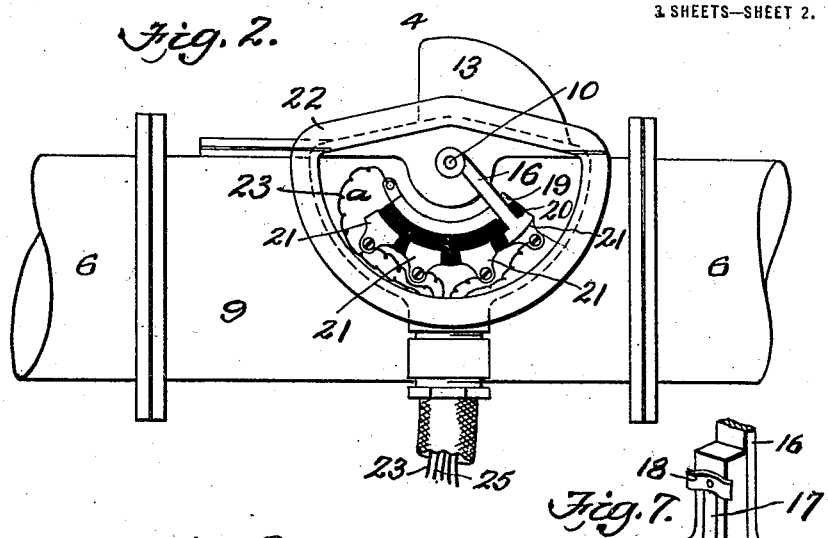
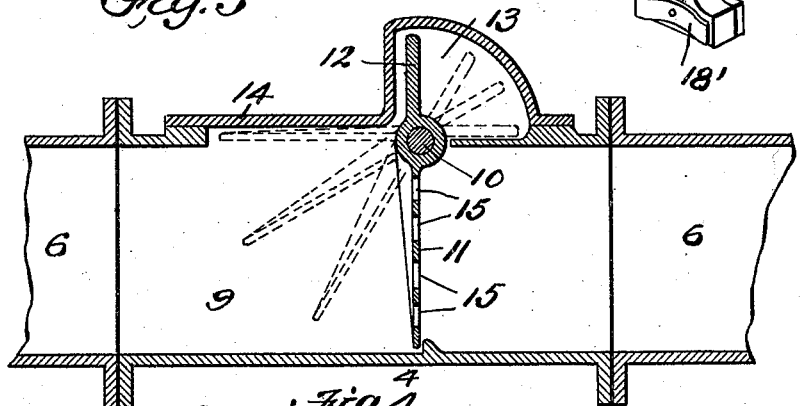
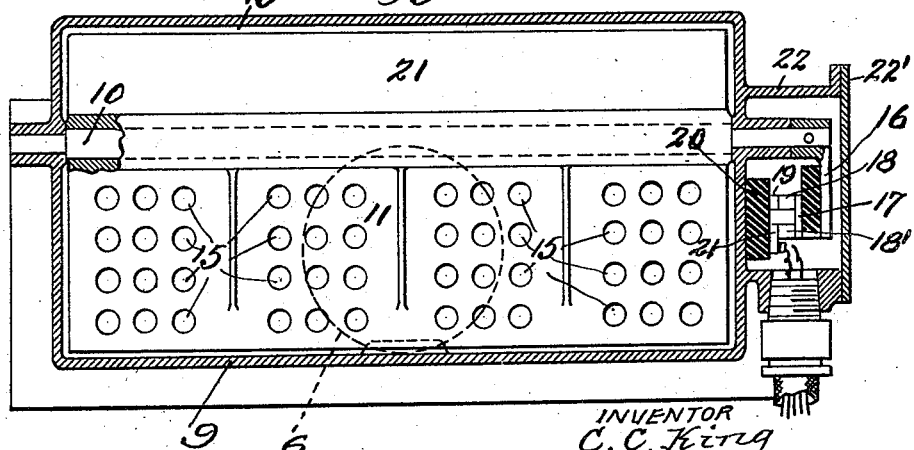

C. C. KING.
STORAGE BATTERY VENTILATING SYSTEM.
APPLICATION FILED SEPT. 5, 1919. RENEWED JAN. 16, 1922.

1,416,214.

Patented May 16, 1922.
3 SHEETS—SHEET 3.

INVENTOR
C. C. King
BY Merens D Blondel
ATTORNEY

UNITED STATES PATENT OFFICE.

CHARLES CLIFTAIN KING, OF BRIDGEPORT, CONNECTICUT, ASSIGNOR TO THE LAKE TORPEDO BOAT COMPANY, OF BRIDGEPORT, CONNECTICUT, A CORPORATION OF MAINE.

STORAGE-BATTERY-VENTILATING SYSTEM.

1,416,214.    Specification of Letters Patent.    Patented May 16, 1922.

Application filed September 5, 1919, Serial No. 321,863. Renewed January 16, 1922. Serial No. 529,745.

*To all whom it may concern:*

Be it known that I, CHARLES CLIFTAIN KING, a citizen of the United States, residing at Bridgeport, in the county of Fairfield and State of Connecticut, have invented new and useful Improvements in Storage-Battery-Ventilating Systems, of which the following is a specification.

The invention relates particularly to improvements in storage-battery ventilating systems such as are employed in submarine boats, and has for its object to provide an apparatus to enable the attendant or other member of the crew to ascertain at a glance whether or not the apparatus is properly working and the battery-cells and battery-compartments are being ventilated.

As is well known in the submarine boat art, storage-batteries are employed for power for various operations of the boat and for propulsive power when operating completely submerged or when the exhausts from the engines are closed, and that dynamos are employed for recharging the batteries, and as is also known gases are generated in the cells especially when the several elements thereof are excited at the time of re-charging, hence making it necessary to draw off such gases and ventilate the cells and the cell compartments. The present method employed for drawing off the gases is by means of suction pumps, or by suction fans or blowers, and in order to test the functioning of the apparatus and whether or not fresh air is being drawn into the cells and cell compartments it is the present practice to place a cloth over the intake end of the air supply pipe and if the cloth should be drawn into the pipe then the attendant will know that air is passing through the cells. This method, however, is inconvenient since the intake end of the air pipes seldom open into readily accessible places.

By my invention I seek to overcome the above stated objections and I accomplish my result by arranging a casing in the vent tube or pipe leading from the battery-compartment between the latter and the suction fan or pump and in arranging a damper in the said casing having a contact adapted to engage a series of contacts in electric circuit therewith, and in the arrangement in an electric light in circuit with each of the series of contacts, so that, when the fan, pump, or blower is in operation the damper will be operated by force of the air current passing through the vent pipe to thus move the terminal of the damper into contact with a series of successively disposed contacts in circuit with the damper terminal and with the electric lights whereby to indicate the position of the damper and the resultant velocity of air passing through the cells and the cell compartment.

The invention comprises certain novel features of construction and peculiar combinations and arrangements of parts as will be hereinafter fully described and then claimed.

Figure 6:
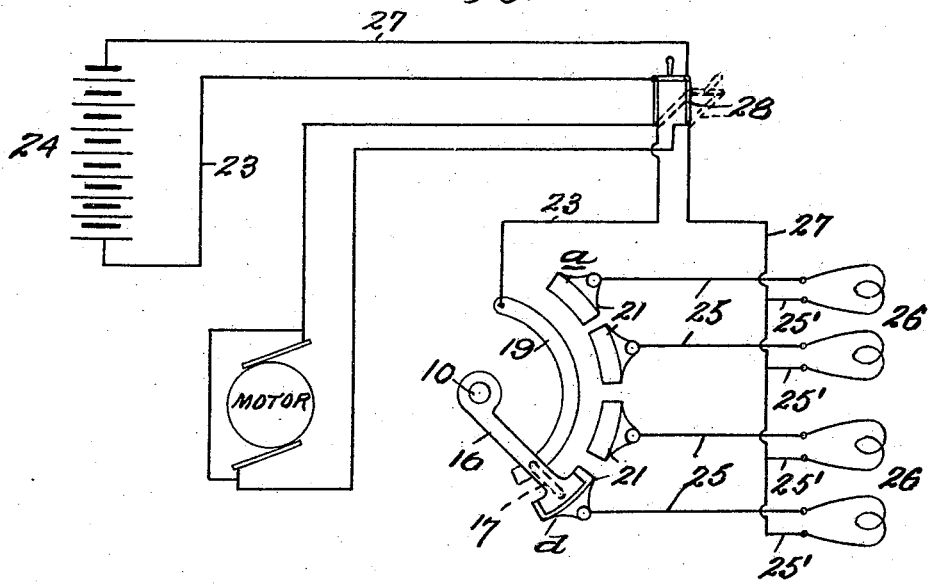

In the drawings, illustrating the invention, in the several figures of which like parts are similarly designated, Figure 1, is a diagrammatic sectional elevation of a battery-compartment and battery-cells arranged therein, illustrating my invention. Fig. 2 is a side view of a section of the vent pipe leading from the compartment illustrating the casing carrying the damper and its coacting terminals, the face plate of the casing being removed. Fig. 3 is a longitudinal section of the same illustrating in dotted lines the various positions of the damper. Fig. 4 is a transverse section drawn on the line 4—4 of Figs. 2 and 3. Fig. 5 is a wiring diagram of the construction illustrated in Fig. 1. Fig. 6 is a wiring diagram illustrating a construction wherein none of the lamps are lighted when the suction fan or pump is idle, irrespective of the movement of the damper. Fig. 7 is a detail of construction.

1 designates a battery-cell compartment having a series of battery-cells 2 arranged therein in the usual manner. Extended through the top of the cell compartment cover adjacent to one end thereof is an air inlet pipe 3 which may be arranged to open through the main hull of the boat and which is provided with an air inlet port 4 opening into the main hull, and operating upon the pipe 3 is a sleeve valve 5 adapted for closing the said port, the said valve being locked in either position for opening or closing the port by means of a set-screw as shown.

Extended through one end of the battery-compartment 1, preferably opposite that of the air inlet pipe 3, is a vent pipe 6 providing an air-duct which is open at its inner end to the space of the cell-compartment, and having a series of branches 7 communicating with the interior of the cells 2 through the tops thereof. Exterior of the cell-compartment 1, the vent pipe 6 is connected to either a suction fan or pump or to a blower as shown at 8 in Fig. 1, and between the latter and the battery-cell-compartment, there is interposed in the vent pipe 6, a rectangular-shape casing 9 in the side walls of which is journaled a shaft 10 upon which is rigidly held a damper 11 having a counterbalance arm or weight 12 which is extended into a recess 13 formed on a plate 14 covering an opening formed in the top of the casing 9. In practice the damper 9 will be formed with a series of perforations 15 so as to permit a slight draft of air to pass through the vent pipe 6 without disturbing the position of the damper.

The shaft 10 is extended through one side of the casing 9 and carries an arm 16 having a conducting bar 17 provided at its ends with brushes 18 and 18′, respectively, one of which, 18, is held in constant engagement with a segmental conducting plate or bar 19 carried by an insulating block 20 secured to the outer face of the casing 9, while its co-acting brush 18′ is designed for engagement with a plurality of contacts 21, also carried by the insulating block 20, and it will be noted that the brush 18′ is wide enough to span the gaps between the contacts so as to engage two of them simultaneously. The arm 16 and its associated parts are enclosed in a housing 22 formed on the side of the casing 9 and has its outer face closed by a plate 22′ as shown.

The conducting bar or plate 19, is connected through a conducting wire 23 with one terminal of a battery 24, shown in Figs. 1, 5 and 6, and from each contact 21 is extended a "leading in" wire 25 of an electric light 26 and from the opposite "leading in" wire 25′ from each light is connected a common conducting wire 27 extending from the opposite terminal of the battery, so that, when the conductor of the arm 16 is in contact or engagement with any one or two adjacent contacts 21, the circuit between the particular light or lights will be completed and the light thus lighted. A switch 28 is arranged in the circuit so as to make or break the same at will.

In the operation of the apparatus, so far as described, when the fan or blower is at rest the damper will hang in a substantially vertical position with the brush of the arm 16 engaging the contact 21, (further designated by the reference character a), then when the fan or blower is set in motion the damper 9 will be swung on its axis as shown in dotted lines in Fig. 3, thus causing the brush 18′ of the arm 16 to be moved across the face of the contacts 21 to light the lamps, thus indicating the relative force of air passing through the vent pipe 6, it being understood, that the damper is moved by the force of the air current passing through the vent pipe.

In practice I purpose to have the fourth lamp, designated d, with a red globe so as to enable the attendant to easily detect the fact that a full and complete ventilation of the cells and compartments is taking place.

In Fig. 6, I show an alternative in the wiring of the apparatus and which is so arranged that none of the lamps may be lighted unless the fan or blower is in motion. This is accomplished by taking the lighting current from the same line switch which supplies current to the fan or blower motor, so that when the switch is closed to start the motor the lamp circuits are simultaneously closed.

It will thus be seen that I provide an exceedingly simple apparatus for the purpose described and whereby the attendant may ascertain the functioning of the ventilating apparatus without extra work and which avoids possible danger of the exhaust from the vent pipe being closed, since it is obvious that should the exhaust be closed the current of air drawn or forced through the pipe would be insufficient to disturb the arm.

It may be stated, that while I have shown the damper casing located in the vent or off-take pipe between battery-compartment and the blower, it is obvious that it may be located in the pipe between the blower and the discharge end of the pipe.

I claim—

1. In a storage-battery ventilating system, a vent tube, means for causing a current of air through said vent tube, a damper arranged in said tube, and an electrically operated indicator associated with said damper for indicating the position of said damper.

2. In a storage-battery ventilating system, comprising a battery-compartment, and storage-battery-cells mounted therein, a vent tube extending from said battery-compartment and communicating therewith and with said cells, means for causing a current of air through said tube, a damper arranged in said tube, an arm carrying electric contacts operable by said damper, and electric lamps in circuit with said contacts and adapted to be lighted through the movement of said damper.

3. In a storage-battery ventilating system, comprising a battery-compartment, and storage-battery-cells mounted therein, a vent tube communicating with said battery-compartment and with said cells, means for causing a current of air through said vent tube, a damper arranged in said vent tube, an arm carrying electric contacts operated by said damper, conductors associated with said contacts, a battery in circuit with said contacts and said conductors, and electric lamps in said circuit.

In testimony whereof I have hereunto set my hand this 24th day of August, A. D. 1919.

CHARLES CLIFTAIN KING.

Witnesses:
E. G. GALLAGHER,
GEO. MANN.